United States Patent [19]

Häfner

[11] Patent Number: 4,611,731

[45] Date of Patent: Sep. 16, 1986

[54] AUTOMATIC METERING APPARATUS

[75] Inventor: Hans W. Häfner, Aichach-Walchshofen, Fed. Rep. of Germany

[73] Assignee: Pfister GmbH, Fed. Rep. of Germany

[21] Appl. No.: 683,999

[22] Filed: Dec. 20, 1984

[30] Foreign Application Priority Data

Dec. 23, 1983 [DE] Fed. Rep. of Germany ....... 3346783

[51] Int. Cl.⁴ ............................................. G01F 11/10
[52] U.S. Cl. .................................. 222/636; 222/288; 222/368
[58] Field of Search .................... 406/62–64, 406/68; 221/211, 278; 222/345, 346, 363, 368, 335, 332, 263, 364, 288, 636

[56] References Cited

U.S. PATENT DOCUMENTS

| 2,540,059 | 1/1951 | Stirr et al. | 222/345 |
| 2,907,499 | 10/1959 | Agronin | 222/368 |
| 2,914,223 | 11/1959 | Richter | 222/332 |
| 2,921,721 | 1/1960 | Brooks | 222/368 |
| 3,450,441 | 6/1969 | Vogt | 406/64 |
| 3,561,372 | 2/1971 | Vogt | 222/345 |
| 3,681,192 | 8/1972 | Reinhall | 222/368 |
| 3,757,995 | 9/1973 | Armstrong | 221/278 |
| 4,108,337 | 8/1978 | Iijima | 222/363 |

FOREIGN PATENT DOCUMENTS 359110 9/1922 Fed. Rep. of Germany ........ 406/64

Primary Examiner—H. Grant Skaggs
Attorney, Agent, or Firm—Armstrong, Nikaido, Marmelstein & Kubovcik

[57] ABSTRACT

An apparatus for volumetric metering of large variable batches of pourable material is disclosed comprising a single chamber of gas-permeable material having a charging port. The chamber is provided in a pivotable gas-tight container, and is connected to a pneumatic system. The container has a position enabling the filing of the metering chamber through the charge port. Positioning of the chamber opening opposite an opening in the housing provides access for insertion and removal of space filling bodies to vary the volume of batches being metered.

10 Claims, 2 Drawing Figures

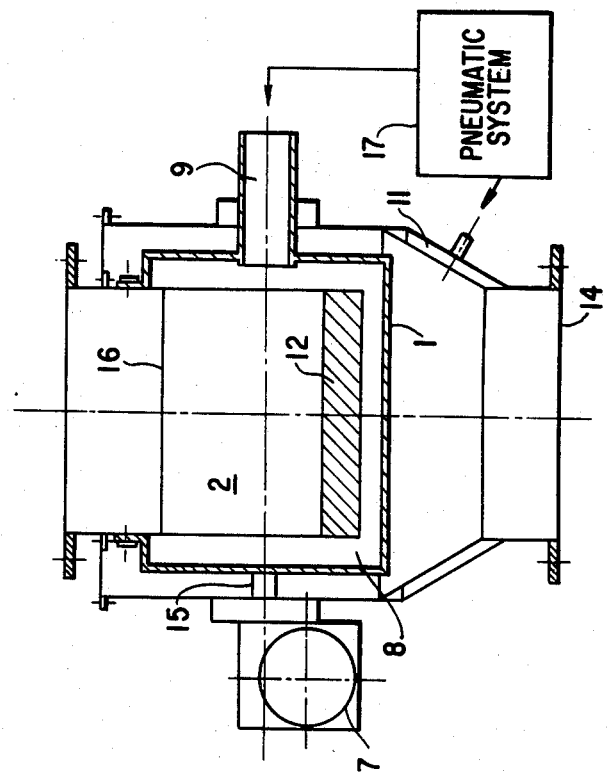
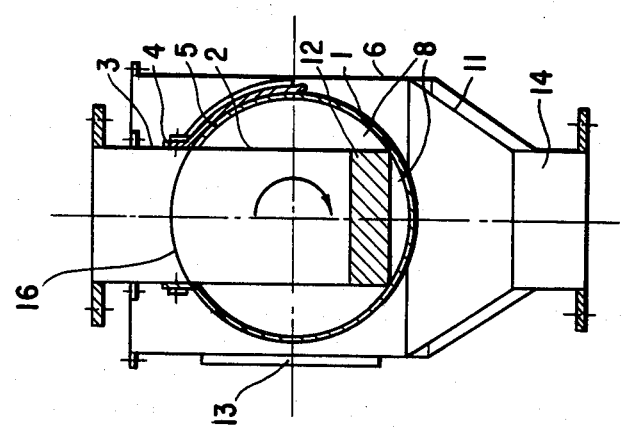
FIG. 2
FIG. 1

4,611,731

AUTOMATIC METERING APPARATUS

FIELD OF INVENTION

The invention relates to an apparatus for automatic metering of pourable material, in particular of pourable material of low density, using a metering chamber provided with a supply port.

BACKGROUND OF THE INVENTION

There have become known automatic metering apparatuses using a metering chamber formed by a space which is defined in an essentially vertical tube between a charge port and a discharge port by two slides laterally moveable in respect to longitudinal axis of the tube. For charging the upper slide is opened whilst the lower slide remains closed. After filling the chamber, the upper slide is closed whilst the lower slide is opened for discharging. Different volumes may be metered by insertion of space-filling bodies. In particular for materials having low density such as styropore or perlite, considerable metering inaccuracies result from changing flowability due to variations in environmental conditions. For the actuation of the slides, considerable force is necessary in order to overcome the friction whilst the space-filling bodies, arranged in the flowing path of the pourable material, obstruct the complete and fast discharge of the material out of the metering chamber.

SUMMARY OF THE INVENTION

It is an object of the present invention to provide an apparatus for volumetric metering of pourable material which can be manufactured with reduced costs.

It is a further object of the invention to provide an apparatus for volumetric metering of pourable material which has a high reliability of operation.

It is a still further object of the present invention to provide an apparatus for volumetric metering of pourable material showing an improved metering accuracy and reproducability.

These and other objects are achieved by an apparatus for volumetric metering of pourable material comprising a metering chamber provided with a charge port and having walls, at least part of which are of gas permeable material, and a container enclosing the metering chamber, having gas impermeable walls, being rotatable or pivotable, being adapted to be connected to a pneumatic system and having a position permitting the charging of the metering chamber through the charge port.

Preferably the walls of the metering chamber are of sintered material.

During the charging phase, the pourable material is sucked into the metering chamber which results in a uniform material density. The apparatus uses only one moving part; it is dust-tight and the wear is very low. Even with high operation speeds a good measuring accuracy and reproducability may be achieved.

BRIEF DESCRIPTION OF THE DRAWINGS

FIG. 1 shows a side view of the embodiment of the apparatus according to the invention and FIG. 2 shows the apparatus of FIG. 1 in side view turned by 90° in respect to the illustration of FIG. 1.

DESCRIPTION OF PREFERRED EMBODIMENT

According to FIGS. 1 and 2, a metering chamber (2), preferably of rectangular cross section, is inserted into the periphery of a cylindrical container (1). The cylindrical container (1) is mounted with its longitudinal axis in the horizontal direction in a dust protection housing (6) and is provided with an opening through which the metering chamber (2) may be fitted into the interior of the container (1) extending, beyond the central portion thereof and occupying most of the interior volume.

The walls of the metering chamber (2) consist at least partially of air-permeable material, preferably a sintered material. For changing the volume of the metering chamber, space-filling bodies (12) may be attached to the bottom of the metering chamber (2) by screws or other securing means. For insertion of the bodies (12), the housing (6) may be provided at one of its side walls by a door (13), through which the bodies (12) may be inserted into the metering chamber (2), upon aligning the charge opening (16) with the opening of the door (13).

At the top of the housing (6), a charge member (3) is provided, which is aligned with the charge opening (16) of the metering chamber (2) when the latter is in upright position. At the bottom, the housing (6) is provided with a discharge member (14), through which the metering chamber (2) may be discharged after turning the charge port (16) into the downward position.

The container (1) may be rotated about its rotational axis by means of a suitable drive, which, according to the present embodiment, is a worm gearing motor (7), which is connected to one of the side walls of the container (1) by a shaft (15), whilst the other side wall of the container (1) is provided with a hollow shaft (9), the interior of which serves as a connection of the interior (8) of the container (1) to a pneumatic system 17 acting bi-directional, i.e. as a suction device for removing air from the interior (8) of the container (1) in the filling phase and as a compression device for supplying air to the interior of the hollow shaft (9) into the interior (8) of the container (1) and through the permeable walls of the metering chamber (2).

The lower edge of the charge member (3) is sealed toward the container (1) by means of sealing strips (4) and a sealing member (5), resiliently engaging the outer surface of the container (1). The sealing member (5) is preferably so designed as to be self-adjusting.

Toward the discharging member (14), the housing (6) has a conical form. The inclined walls (11) may be provided with holes or slots for air supply in order to avoid deposition of material during the discharging phase.

In operation, for charging the metering chamber (2) through the charge member (3), the charge port (16) of the metering chamber (2) is brought into alignment with the charge member (3). During the charging of the metering chamber (2), a vacuum is produced in the interior (8) of the container (1) by sucting of the air through the hollow shaft (9). Due to the air-permeability of the walls of the metering chamber (2), a constant vacuum is produced in the metering chamber (2), which ensures a fast and uniform filling-in of material. Upon complete filling of the metering chamber (2), the worm gearing motor (7) is energized in order to rotate the container (1), preferably about 180° in clockwise direction (FIG. 1). As soon as the leading edge of the charge port (16) leaves the sealing member (5), discharging of the metering chamber (2) begins and continues up to a complete discharging of the metering chamber (2) through the discharge member (14). The discharging of material from the metering chamber (2) is enhanced by applying air pressure through the hollow shaft (9) to the interior (8) of the container (1), which air pressure is transmitted through the air-permeable walls of the metering chamber (2). Thus, the latter is discharged fast and completely.

For a new charging step, container (1) is brought back into the charge position either by continuing the rotation of container (1) by another 180° or by rotating the container (1) in counter-clockwise direction.

As may be appreciated, the total metering process may be accomplished either continuously, or the rotation of the container (1) may be stopped in the charging and/or discharging position.

It should be further noted that, due to the cylindrical form of the container (1) and its sealing toward the charge member (3), excessive material in the charge member (3) will be kept in position until the charge port (16) returns to the charging position.

For an automatic control of the application of vacuum and/or pressure in the interior (8) of the container (1), switches may be provided for sensing the rotating position of the container (1).

I claim:

1. An apparatus for volumetric metering of variable batches of pourable material comprising:
    a hollow air-tight container rotatable about an axis;
    a single metering chamber inserted into the periphery of said container extending through the central portion thereof and occupying a major portion of the interior volume of said container, said metering chamber having an opening at said periphery forming a charge port therein for receiving said pourable material and having walls at least part of which are gas permeable;
    a pneumatic system connected to the interior of said air-tight container and operative through said gas permeable walls as a pneumatic system applied to said metering chamber; and
    means for varying the volume of said metering chamber comprising space filling bodies insertable into said metering chamber.

2. The apparatus of claim 1 wherein at least part of said walls of said metering chamber are of sintered material.

3. The apparatus of claim 1 further comprising a dust-tight housing surrounding said air-tight container and having a discharge member positioned below said container for discharging said metering chamber, said container being journalled for rotation within said dust-tight housing, and an access door in said housing for providing access to said metering chamber.

4. The apparatus of claim 3 wherein a charge member is provided at the top of said dust-tight housing, said charge member being in sealed engagement with said container.

5. The apparatus of claim 4 wherein said container is formed as a drum and is journalled for rotation about a horizontal axis in sealed engagement with said charge member for charging said metering chamber when said charge port of said metering chamber is in approximate alignment with said charge member.

6. The apparatus of claim 5 wherein said sealing engagement is accomplished by a self-adjusting sealing member.

7. The apparatus of claim 5 wherein the position of the container is sensed for controlling the application of pneumatic pressure to the interior of said container.

8. The apparatus of claim 1 wherein said container is enclosed within a dust-tight housing provided with a closable opening for access to said metering chamber through which said space filling bodies may be inserted into and removed from said metering chamber.

9. The apparatus for volumetric metering of variable batches of pourable material comprising:
    a hollow air-tight container rotatable about an axis;
    a single metering chamber in said container extending from the periphery through the central portion of said container and occupying a major portion of the interior volume thereof, said metering chamber having an opening forming a charging port therein for receiving said pourable material and having walls at least part of which are gas permeable;
    a pneumatic system connected to the interior of said air-tight container and operative through said gas permeable walls as a pneumatic system applied to said metering chamber, said pneumatic system being connected to the interior of said container by a single connection and acting alternately as a vacuum system and as a pressure system connected to the interior of said container wherein charging and discharging of said metering chamber may be controlled as a discontinuous operation; and
    means for varying the volume of said metering chamber comprising space filling bodies insertable into said metering chamber.

10. The apparatus of claim 9 wherein said single connection is a hollow shaft journalled for rotating said container.

* * * * *